United States Patent Office 3,033,799
Patented May 8, 1962

3,033,799
CATALYST MANUFACTURE
Alfred M. Thomsen, 265 Buckingham Way, Apt. 402,
San Francisco, Calif.
No Drawing. Filed July 29, 1958, Ser. No. 751,634
3 Claims. (Cl. 252—450)

The manufacture of catalysts covers an extremely wide field, so the instant application is confined solely to that type in which the active medium, be it a metal or its compounds or a mixture of both, or mixtures of various metals and/or their compounds, are supported upon a silica base, said base itself being of the type generally called "activated," meaning thereby "possessing a very large internal area and a multitude of pores." The catalytic material, proper, is supposedly in the form of an extenuated film covering this internal area and thus presenting an almost inconceivably large surface within a relatively small volume. This aim, however, is in the nature of an unproved supposition and the degree of activity resulting may vary widely even though the chemical composition is identical. It is my contention that the method whereby a silica skeleton is covered with the catalyst is of as much importance as the actual composition of the catalytic material. My process, therefore, consists of two inter-connected parts, namely, the production of said silica skeleton and then the means employed to spread the catalyst, per se, as evenly as possible over the entire area thus provided.

To prepare the silica skeleton I prefer to start with a complex mineral of the magnesium silicate type wherein a notable part of said magnesium has been replaced by other metals among which iron, aluminum, calcium, and the alkali metals preponderate. Such minerals are extremely difficult to classify by name, hence I refer to their composition. It may be said that the more complex the composition, the better for my purpose. The reason is not definitely known as nothing remains after treatment save the silica skeleton, but I believe the advantage lies in the fact that such complex silicates are more readily attacked by dilute acids than those of more simple composition. I have found, that the more dilute the acid and, hence, the slower the attack, the greater becomes the characteristics relating to "adsorption," and this is a fundamental in my approach to the problem of making a better catalyst.

To elucidate, I shall commence with a description of how I make a silica-alumina catalyst, but obviously I do not confine my self to this one type as the variations now in use are enormous. I commence with such a mineral as I have described in which the magnesia base has been replaced to an extent of 25% by iron and alumina, with just a little calcium and alkali metals forming a part of the replacement. Intermixed with the crystallization of the various magnesian minerals is also a few percent of heavier minerals that are not attacked by the acid treatment, to follow, and hence remain with the silica residual, said silica residual constituting about 50% of the original mineral. I commence by grinding said mineral so that all will pass a 100 mesh sieve. Acid treatment consists in commingling the powdered mineral with sulphuric acid which may be in any dilution from 100% acid to a solution of as little as 25% of sulphuric acid.

In this case I will assume that I have selected an acid containing 50% of sulphuric acid, and as the mineral will need approximately its own weight of 100% acid I shall add in addition an excess of 25% making a total of 2½ times its weight of 50% acid. Heat is applied and in about two hours the reaction will be finished as indicated by the acidity of the mixture remaining constant. The insoluble residue is next thoroughly washed to remove excess of acid and the soluble sulphates produced in the reaction. Manifestly, this item is of value and not a discard, but the processing of the mixture is outside the scope of this disclosure.

This insoluble residue is now essentially silica but in addition there may be some unattacked heavy minerals which now are far heavier than the hydrated silica, hence they are easily removed by any conventional gravity separation. After such separation the silica should be quite free and on drying will be a rather pure white powder. In general, I prefer to dry as herein indicated though there is one notable exception which I will describe at a later period.

Such dry powder has excellent adsorption properties and I take advantage of this in the following manner. I expose it to cold, dry ammonia gas until saturated. This may be done in a screw conveyor trough on a continuous basis and then dropped directly into an agitated solution of pure aluminum sulphate. Obviously, the amount of ammonia adsorbed can be augmented by decreasing the temperature or by working under pressure, or both. In any event, an amount of aluminum hydroxide corresponding to the adsorbed ammonia will be deposited on the internal surface of the porous silica and will thus be spread evenly over the entire surface, and a corresponding amount of ammonium sulphate will pass into solution.

Separation is next made between solids and liquid, and said solids are washed to remove all soluble salts. After drying and calcining at 1100° F. the result constitutes the finished catalyst in so far as its chemical aspects is concerned. To improve its mechanical properties I pass it over a 200 mesh sieve and regrind the oversize until all has passed through the sieve. Inasmuch as fines less than 15 microns are instantly lost in use, I next pass everything through an air floating machine so that all such fine material is likewise removed.

Such fines may amount to as much as 15% of the total, and even more, so it is indispensable that they be utilized. Actually this fraction is more active than the accepted portion so I commingle it with enough sodium silicate of better than a 3:1 ratio diluted to a consistency of 30% total solids, to pour it in thin streams into a concentrated solution of sodium bi-carbonate containing some suspended bicarbonate which will dissolve as the reaction permits.

Separation is next made between solids and liquid in any conventional manner. The solids, which are coarsely granular, are thoroughly washed to free from soluble salts, dried and added to the main body being treated so as to undergo the calcination step. By thus re-cycling, in coarse form, the fines previously discarded all will eventually become part of the accepted catalyst. In this operation, the silica derived from the sodium silicate will likewise adsorb ammonia and the re-cycled fines will do likewise in spite of their alumina content. Such being the case it is obvious that the ratio of silica to alumina in the finished product can be altered to any degree desired by simply treating the calcined product once again with ammonia and then commingling it with additional aluminum sulphate solution.

While this constitutes the best method of increasing the ratio of alumina to silica, there is a deviation which will produce approximately the same over-all result. This constitutes the exception previously noted. If the silica resulting from the acid treatment and washing steps be given its final wash with a pure solution of aluminum sulphate and then exposed to ammonia gas, much aluminum hydroxide will be formed within the pores of said silica. After washing and calcination such aluminum hydroxide will be converted into alumina. It will not be as well distributed as would have been the case if ammonia had been previously adsorbed but will still coat the walls of the larger pores. Subsequent treatment with ammonia, after calcination, and secondary deposition of aluminum hydroxide will largely correct this flaw, hence, I give this second version as my second example, easily understood in the light of the previous explanation.

So far, I have confined myself to the application of alumina to the silica skeleton derived from acid treatment of a magnesium complex, but it will be obvious that almost any other soluble metallic salt could be substituted. In this manner any metal, or metallic compound, or mixtures thereof, capable of precipitation with ammonia, would result. For this reason I have expressly stated that I do not confine my process to the manufacture of a silica-alumina catalyst. Contrariwise, I believe that the specific method I have disclosed herein is capable of adoption, with but little variation, to the manufacture of a wide range of catalysts. To do so will require only ordinary chemical skill and will be readily understood and followed by any competent operator without further instruction than that given in the preferred version, i.e., a silica-alumina catalyst, chosen solely for the purpose of illustration.

Minor deviations that I consider as within the scope of my disclosure are based upon items inherent in the disclosure not especially accented. Thus, an improved catalyst is actually produced from the sodium silicate even if it were not used as cementing material for silica-alumina fines. Precipitated aluminum hydroxide in any amount may be incorporated with a solution of sodium silicate and the mixture run into a saturated solution of sodium bi-carbonate as I have just described. After washing and calcination an excellent catalyst will be obtained though the silica skeleton in this case is entirely artificial. Secondary treatment with adsorbed ammonia followed by immersion in a solution of aluminum sulphate will not only increase the alumina content but also increase its effectiveness. Or sodium silicate may be solidified by immersion in a solution of sodium bi-carbonate, washed and dried. Subsequent treatment with ammonia and aluminum sulphate, in the manner previously described will likewise yield an acceptable product. In general, however, I prefer to use the silica skeleton yielded by acid treatment of a complex, substituted, magnesium silicate.

I claim:

1. The method of making a silica-alumina catalyst which comprises; comminuting a natural, substituted, magnesium silicate of the type wherein a part of said magnesium has been replaced by metals of the group consisting of iron, aluminum, calcium and alkali metals; commingling said comminuted mineral with an excess of sulphuric acid over and above that required for the stoichiometric demand of the resident bases; removing the soluble sulphates thus produced by a water wash; drying the resultant silica and saturating same with ammonia gas; immersing the resultant product in a water solution of an aluminum salt; separating the resultant composite of silica and aluminum hydroxide from the circumambient liquor and washing with water until free from soluble salts; drying and heating said silica-aluminum hydroxide composite until water of hydration shall be substantially expelled; air floating the resultant anhydrous composite to remove particles with a diameter of 15 microns and less; commingling said separated fines with sodium silicate solution in such an amount that the mixture can be poured in thin streams into a saturated solution of sodium bicarbonate; commingling fines, sodium silicate and sodium bicarbonate solution in said manner; separating the granular product thus formed from unused sodium bi-carbonate solution; washing the granular product with water until free from soluble salts and re-cycling said product to the main body from which it had been separated by air floating at a point prior to the de-hydration step.

2. The method of making a silica-alumina catalyst set forth in claim 1, with the added step that the product obtained therein be heated to substantial de-hydration; saturated with gaseous ammonia; immersed in a solution of an aluminum salt; and again washed free from soluble salts by a water wash.

3. The method of making a silica-alumnia catalyst set forth in claim 1, with the added step that the de-hydrated material obtained therein be ground so as to pass a 200 mesh sieve prior to air floating thus increasing the percentage of fines removed by said air floating step and finally yielding an accepted product substantially sized in the range between 75 microns and 15 microns.

References Cited in the file of this patent

UNITED STATES PATENTS

| | | |
|---|---|---|
| 1,884,709 | Jenkins | Oct. 25, 1932 |
| 2,292,632 | Greger | Aug. 11, 1942 |
| 2,430,289 | Gary | Nov. 4, 1947 |
| 2,432,746 | Gary | Dec. 16, 1947 |
| 2,449,891 | Gary | Sept. 21, 1948 |
| 2,487,065 | Milliken | Nov. 8, 1949 |
| 2,551,580 | Bond | May 8, 1951 |
| 2,574,895 | Stecker | Nov. 13, 1951 |
| 2,584,148 | Mills | Feb. 5, 1952 |